United States Patent [19]

Garleb et al.

[11] Patent Number: 5,085,883
[45] Date of Patent: Feb. 4, 1992

[54] BLEND OF DIETARY FIBER FOR NUTRITIONAL PRODUCTS

[75] Inventors: Keith A. Garleb, Powell; James N. Chmura, Pickerington; Paul S. Anloague, Columbus; Mary B. Cunningham; David C. Sertl, both of Westerville, all of Ohio

[73] Assignee: Abbott Laboratories, Abbott Park, Ill.

[21] Appl. No.: 722,437

[22] Filed: Jun. 27, 1991

[51] Int. Cl.$^5$ .............................. A23L 2/38
[52] U.S. Cl. ..................... 426/590; 426/482; 426/573; 426/804; 424/439; 514/53; 514/951; 514/965
[58] Field of Search ................ 426/804, 93, 482, 573, 426/590

[56] References Cited

U.S. PATENT DOCUMENTS

| | | | |
|---|---|---|---|
| 4,089,981 | 5/1978 | Richardson | 426/577 |
| 4,143,163 | 3/1979 | Hutchison | 426/804 |
| 4,156,021 | 5/1979 | Richardson | 426/577 |
| 4,348,379 | 9/1982 | Kowalsky | 426/804 |
| 4,401,682 | 8/1983 | Battista | 426/804 |
| 4,528,205 | 7/1985 | Turrisi | 426/804 |
| 4,565,702 | 1/1986 | Morley et al. | 426/93 |
| 4,619,831 | 10/1986 | Sharma | 426/804 |
| 4,680,189 | 7/1987 | Schumacher | 426/804 |
| 4,698,232 | 10/1987 | Sheu | 426/804 |
| 4,710,390 | 12/1987 | Schumacher | 426/804 |
| 4,747,881 | 5/1988 | Shaw | 426/577 |
| 4,766,004 | 8/1988 | Moskowitz | 426/613 |
| 4,774,098 | 9/1988 | Gould | 426/573 |
| 4,774,099 | 9/1988 | Feeney | 426/804 |
| 4,784,861 | 11/1988 | Gri | 426/804 |
| 4,790,991 | 12/1988 | Shaw | 426/74 |
| 4,806,475 | 2/1989 | Gould | 435/165 |
| 4,818,539 | 4/1989 | Shaw | 426/74 |
| 4,834,990 | 5/1989 | Amer | 426/804 |
| 4,851,392 | 7/1989 | Shaw | 426/658 |
| 4,877,627 | 10/1989 | Leitz | 426/804 |
| 4,915,960 | 4/1990 | Holmgren | 426/804 |
| 4,923,981 | 5/1990 | Weibel | 426/602 |
| 4,927,649 | 5/1990 | Antenucci | 426/804 |
| 4,959,227 | 9/1990 | Amer | 426/35 |
| 4,971,810 | 11/1990 | Hoyda | 426/583 |
| 4,976,982 | 12/1990 | Gillmore | 426/804 |
| 4,983,405 | 1/1991 | Cherukuri | 426/804 |
| 4,994,115 | 2/1991 | Giesfeldt | 426/482 |
| 4,996,063 | 2/1991 | Inglett | 426/804 |
| 5,024,996 | 6/1991 | Rinje | 426/804 |

FOREIGN PATENT DOCUMENTS

| | | | |
|---|---|---|---|
| 0317079 | 10/1988 | European Pat. Off. | 426/804 |
| 2729370 | 1/1978 | Fed. Rep. of Germany | 426/804 |
| 2-227046 | 9/1990 | Japan . | |

OTHER PUBLICATIONS

McKenzie 1990, A Tangle of Fibers, Food Technology, Aug. 1990, pp. 54, 58, 59.
American Association of Cereal Chemists (AACC) Method 32-07.
"Applications of Soluble Dietary Fiber", Food Technology, Jan. 1987, pp. 74-75.
"Fermentability of Various Fiber Sources By Human Fecal Bacteria In Vitro$^{1-3}$", *American Journal of Clinical Nutrition*, 1991:53:1418-1424.
*Physiological Effects and Health Consequences of Dietary Fiber*, Life Sciences Research Office, Federation of American Societies for Experimental Biology, Jun. 1987.

*Primary Examiner*—Carolyn Paden
*Attorney, Agent, or Firm*—Lonnie R. Drayer; Donald O. Nickey

[57] ABSTRACT

Taken as a whole a blend of dietary fiber contains, by weight: 5% to 50% of a dietary fiber which is both soluble and fermentable; 5% to 20% of a dietary fiber which is both soluble and non-fermentable; and 45% to 80% of a dietary fiber which is both insoluble and non-fermentable. Preferably, the dietary fiber which is both soluble and fermentable is gum arabic; the dietary fiber which is both soluble and non-fermentable is sodium carboxymethylcellulose; and the dietary fiber which is both insoluble and non-fermentable is oat hull fiber.

26 Claims, No Drawings

BLEND OF DIETARY FIBER FOR NUTRITIONAL PRODUCTS

FIELD OF THE INVENTION

The present invention relates generally to a blend of dietary fibers for use as a component of a nutritional product.

BACKGROUND OF THE INVENTION

Numerous types of dietary fibers are currently available. Basically, dietary fiber passes through the small intestine undigested by enzymes and is a kind of natural and necessary laxative. Dietary fiber is understood to be all of the components of a food that are not broken down by enzymes in the human digestive tract to produce small molecular compounds which are then absorbed into the bloodstream. These components are mostly celluloses, hemicelluloses, pectin, gums, mucilages, lignin and lignin material varying in different plants according to type and age. These fibers differ significantly in their chemical composition and physical structure and subsequently their physiological function. Those skilled in the art have attempted to identify fibers (or fiber systems) which will normalize bowel function, alter glucose absorption, lower serum cholesterol and/or serve as an indirect energy source for the colon.

There are many publications relating to dietary fiber.

Japanese published patent application Kokai No. Hei 2-227046 published Sept. 10, 1990 teaches the use of dietary fiber, including gum arabic, as embulsifying agents in food products.

U.S. Pat. Nos. 4,565,702 and 4,619,831 teach dietary fiber compositions prepared by coating an insoluble fiber with a soluble fiber.

U.S. Pat. No. 4,834,990 teaches a non-dairy liquid food product made by adding dietary fiber and calcium to a fruit juice or a drink.

U.S. Pat. No. 4,959,227 teaches a food product prepared from an aqueous composition containing non-fat milk solids and dietary fiber.

The properties of fibers (or fiber systems) most often related to physiological function are solubility and fermentability. With regard to solubility, fiber can be divided into soluble and insoluble components based on the fiber's capacity to be solubilized in a buffer solution at a defined pH. Fiber sources differ in the amount of soluble and insoluble fiber they contain. As used herein and in the claims "soluble" and "insoluble" dietary fiber is determined using American Association of Cereal Chemists (AACC) Method 32-07. As used herein and in the claims "total dietary fiber" or "dietary fiber" is understood to be the sum of the soluble and insoluble dietary fiber determined by AACC Method 32-07 and wherein by weight at least 70% of the fiber source comprises dietary fiber. As used herein and in the claims a "soluble" dietary fiber source is a fiber source in which at least 60% of the dietary fiber is soluble dietary fiber as determined by AACC Method 32-07, and an "insoluble" dietary fiber source is a fiber source in which at least 60% of the total dietary fiber is insoluble dietary fiber as determined by AACC Method 32-07. Examples of soluble dietary fiber sources are gum arabic, sodium carboxymethylcellulose, guar gum, citrus pectin, low and high methoxy pectin, barley glucans and psyllium. Examples of insoluble dietary fiber sources are oat hull fiber, pea hull fiber, soy fiber, beet fiber, cellulose, and corn bran.

"Applications of Soluble Dietary Fiber", FOOD TECHNOLOGY, January 1987, pages 74–75, teaches that the use of gum arabic and low viscosity grades of carboxymethylcellulose will allow the introduction of soluble dietary fiber into a liquid food, but that: "Itis virtually impossible to formulate a good tasting, high fiber drink using insoluble forms of fiber." The dietary fiber system of the present invention succeeds in overcoming this hurdle by providing a unique blend of soluble and insoluble fibers.

A second property of fiber is the capacity to be fermented by the anaerobic bacteria present in the human large bowel. Certain beneficial effects of dietary fiber in the human diet may be mediated by short chain fatty acids (SCFAs) produced during anaerobic fermentation in the large bowel. Furthermore, it is clear that certain beneficial effects of increased dietary fiber consumption may result from chemical and/or physical properties of the intact fiber (e.g. water holding capacity and absorption of bile acids). Dietary fibers vary significantly in their fermentability. As used herein and in the claims the term "non-fermentable" is understood to refer to dietary fibers which have a relatively low fermentability of less than 40%, preferably less than 30%, and the term "fermentable" is understood to refer to dietary fibers which have a relatively high fermentability of greater than 60%, preferably greater than 70%. Examples of fermentable dietary fiber sources are gum arabic and guar gum. Examples of non-fermentable dietary fiber sources are carboxymethylcellulose (CMC), oat hull fiber and corn bran.

As used herein and in the claims fermentability is determined by the following method, which is also described in "Fermentability of various fiber sources by human fecal bacteria in vitro[1-3]" at AMERICAN JOURNAL OF CLINICAL NUTRITION, 1991; 53: 1418–1424. A healthy human donor serves as a source of fecal material from which an inoculum is prepared. For 8 days before the onset of the experiment, the fecal donor should consume more than 20 g of total dietary fiber per day. This level of consumption may be ensured by consumption of commercial products containing mixtures of soluble and insoluble fibers. An inoculum is prepared from fecal material by mixing 20 g of feces with 180 g of an anaerobic dilution solution and then by blending the mixture and filtering it through cheese cloth. The anaerobic dilution solution is prepared as presented below. The inoculumn is prepared under carbon dioxide to maintain anaerobiosis.

| ANAEROBIC DILUTION SOLUTION[a] (1 Liter) | |
|---|---|
| INGREDIENT | AMOUNT |
| Mineral solution 1[b] | 37.5 mL |
| Mineral solution 2[c] | 37.5 mL |
| Resazurin solution (.1% w/v)[d] | 1.0 mL |
| NaHCO$_3$ | 6.37 g |
| Distilled H$_2$O (sonicated) | 924.0 mL |
| cysteine HCl.H$_2$O | 0.5 g |

[a]Mix minerals 1 and 2, resazurin and water, saturate with carbon dioxide, and add NaHCO$_3$ and autoclave. Add 0.5 g of cysteine HCl to cooled solution.
[b]K$_2$HPO$_4$, 0.6 g; Na Citrate.2H$_2$O, 0.2 g; d H$_2$O, 100 mL.
[c]NaCl, 1.2 g; (NH$_4$)SO$_4$, 1.2 g; KH$_2$PO$_4$, 0.6 g; CaCl$_2$, 0.12 g; MgSO$_4$.7H$_2$O, 0.25 g; Na Citrate.2H$_2$O, 2 g; d H$_2$O 100 mL; (dissolve salts in H$_2$O in above order).
[d]Resazurin, 0.05 g; d H$_2$O, 50 mL.

An in vitro medium composition is prepared as presented below. One day before the start of the fermentation, all ingredients except cysteine are mixed together, purged with carbon dioxide, autoclaved, capped, and refrigerated. Just before the fermentation, the medium is warmed to 37° C., purged with carbon dioxide, and cysteine added.

| IN VITRO MEDIUM COMPOSITION | |
|---|---|
| INGREDIENT | AMOUNT (%) |
| Volume:volume | |
| Salts A* | 33.0 |
| Salts B † | 33.0 |
| Water | 30.61 |
| Vitamin mix ‡ | 2.0 |
| Minerals solution§ | 1.0 |
| Hemin solution (0.5 g/L) | 0.25 |
| Resazurin solution (1 g/L) | 0.10 |
| SCFA mix | 0.04 |
| Weight:volume | |
| Yeast extract | 0.05 |
| Trypticase | 0.05 |
| $Na_2CO_3$ | 0.40 |
| Cysteine $HCl.H_2O$ | 0.05 |

*Composition (g/L): NaCl, 5.4; $KH_2PO_4$, 2.7; $CaCl_2.H_2O$, 0.16; $MgCl.6H_2O$, 0.12; $MnCl_2.4H_2O$, 0.06; $CoCl_2.6H_2O$, 0.06; $(NH_4)_2SO_4$, 5.4.
† Composition: 2.7 g $K_2HPO_4$/L.
‡ Composition (mg/L): thiamin-HCl, 100; pantothenic acid, 100; niacin, 100; pyridoxine, 100; riboflavin, 100; folic acid. 2.5; biotin, 2.5; para.aminobenzoic acid (PABA), 5; vitamin B-12, 0.25; phylloquinone, 50.
§Composition (mg/L)L: ethylenadiaminetetraacetic acid (EDTA) disodium salt, 500; $FeSO_4.7H_2O$, 200; $ZnSO_4.7H_2O$, 10; $H_3PO_4$, 30; $CuCl_2.2H_2O$, 1; $NiCl_2.6H_2O$, 2; $Na_2MoO_4.2H_2O$, 3.
Short-chain fatty acid composition (25% each): N-valeric acid, isovaleric acid, isobutyric acid, DL-2-methylbutyric acid.

The fermentation is conducted by adding 30 mL of the medium and 1 mL of the inoculum to 50-ml centrifuge tubes that are fitted with one-way gas-release valves and should contain 0.31 g of the fiber being evaluated. Additions to the tubes are made under a stream of carbon dioxide. The tubes should be incubated at 37° C.

Fermentation should be stopped after 24 hours by refrigerating the sample. After refrigeration, the sample is mixed with four volumes of 95% ethanol, allowed to precipitate for 1 hour, and then filtered through Dacron (pore size 20–70 μm). The Dacron and residue are dried at 57° C., the residue is scraped into a preweighed vial and, after drying at 57° C., the residue is weighed. It is understood that the residue comprises a mixture of microbial mass and non-fermentable dietary fiber and it is assumed for the purpose of the present invention that if the residue is by weight $x$ % of the starting material, then the starting material comprised at least $(100-x)$ % fermentable dietary fiber.

These properties of fiber solubility and fermentability are useful in identifying fibers for the treatment and/or prevention of certain conditions. For example, the purpose of the fiber in some nutritional products is to normalize bowel function. As used herein the phrase "normalize bowel function" refers to the treatment and prevention of constipation or diarrhea.

DETAILED DESCRIPTION OF THE INVENTION

At page 161 of a report entitled PHYSIOLOGICAL EFFECTS AND HEALTH CONSEQUENCES OF DIETARY FIBER, prepared for the Center For Food Safety and Applied Nutrition, Food and Drug Administration, Department of Health and Human Services, Washington, D.C., U.S.A. by Life Sciences Research Office, Federation of American Societies For Experimental Biology, Bethesda, Md., U.S.A., (June 1987) it is estimated that the dietary fiber in a recommended diet would comprise approximately 70–75% insoluble fibers and 25–30% soluble fibers. The report states that this is approximately the ratio found in a diet containing a wide variety of foods. Based upon this published report a decision was made to evaluate the use of a fiber blend having a 75/25 ratio of insoluble and soluble fibers with the soluble portion further described as fermentable and non-fermentable. Potential insoluble fibers included pea and/or oat hull fiber while the soluble components could be gum arabic (fermentable) and/or guar gum (fermentable).

The feasibility/optimization work occurred in two main phases using a 1250 kcal nutrient base formulation containing canola oil as 50% of the oil blend. The recipe for the base formulation is presented in TABLE I. The procedure for preparing the base formulation is set forth in the paragraphs immediately following TABLE I. The batches produced during these initial phases of the investigation were of relatively small sizes, for example 25 to 50 pounds. The bill of materials and mixing procedure were developed for a 1,000 pound batch. A person of ordinary skill in the art should have no difficulty in scaling the amounts of the ingredients depending upon the batch size.

TABLE I

| INGREDIENT | TOTAL ADDED PER 1000 LBS FINISHED PRODUCT |
|---|---|
| Canola Oil | 16.7 Pounds |
| High Oleic Safflower Oil | 10.2 Pounds |
| Medium Chain Triglycerides (Fractionated Coconut Oil) | 6.8 Pounds |
| Oil Soluble Vitamin Lecithin | 1.50 Pounds |
| Premix (containing Vitamin A, D, E and K)[1] | 27.3 Grams |
| Calcium Caseinate | 5.91 Pounds |
| Water | 764.8 Pounds |
| Ultra Trace Mineral/Trace Mineral Premix[2] | 109 Grams |
| Potassium Chloride | 0.85 Pounds |
| Potassium Iodide | 0.086 Grams |
| Magnesium Sulfate | 0.707 Pounds |
| Magnesium Chloride | 1.85 Pounds |
| Micronized Tricalcium Phosphate | 2.13 Pounds |
| Hydrolized Corn Starch (Dextrose Equivalent 10.0) | 96.7 Pounds |
| Hydrolized Corn Starch (Dextrose Equivalent 20.0) | 32.2 Pounds |
| Sodium Caseinate | 38.9 Pounds |
| Potassium Citrate | 1.953 Pounds |
| Sodium Citrate | 1.06 Pounds |
| FIBER VARIED IN EXPERIMENTS | |
| Ascorbic Acid | 242 Grams |
| 45% Potassium Hydroxide | 126 Grams |
| Choline Chloride | 252.5 Grams |
| Carnitine | 80.0 Grams |
| Water Soluble Vitamin Premix[3] | 75.2 Grams |
| Taurine | 70.2 Grams |

[1]Each gram of the premix provides about: 106,400–115,500 IU Vitamin A Palmitate; 5,700–7,500 IU Vitamin D3; 645–825 IU Vitamin E; 1,100–1,600 mg Vitamin K1
[2]Each gram of the premix provides about: 77–88 mg Zinc; 59–67 mg iron; 17–18 mg manganese; 7–8 mg copper; 2–3 mg selenium; 2–3 mg chromium; 5–6 mg molybdenum
[3]Each gram of the premix provides about: 326–424 mg Niacinamide; 211–274 mg d-Calcium Pantothenate; 7–10 mg Folic Acid; 54–70 mg [Thiamine Chloride Hydrochloride]; 42–55 mg Riboflavin; 52–67 mg Pyridoxine Hydrochloride; 138–193 mg Cyanocobalamin; 6–8 mg Biotin A protein-in-fat slurry is prepared by placing the canola oil, high oleic safflower oil and medium chain triglycerides oil to a tank and heating the oil blend to a temperature in the range of 140° to 150° F. under agitation. The oil soluble vitamin lecithin is added to the oil blend, and then the vitamin premix is added to the oil blend. The calcium caseinate is added to the oil blend under agitation.

A carbohydrate/mineral slurry is prepared by placing about 124 to 131 lbs of water in a tank and heating the water to a temperature in the range of 145° to 160° F. The ultra trace mineral/trace mineral premix is added to the water and the mixture is agitated for five minutes. Add the potassium chloride, potassium iodide, magnesium phosphate and tricalcium phosphate to the mixture with agitation. Add the hydrolized corn starch (dextrose equivalent 10.0) to the mixture and agitate thoroughly. Add the hydrolized corn starch (dextrose equivalent 20.0) to the mixture and mix well. Hold the mixture at a temperature in the range of 140° to 160° F.

A protein in water slurry is prepared by placing about 276 lbs of water in a tank and heating it to a temperature in the range of 145° to 155° F. Add the sodium caseinate to the water and agitate the mixture until the sodium caseinate is dissolved. Hold the slurry at a temperature in the range of 140° to 150° F.

Prepare a citrate slurry by placing about 275-282 pounds of water in a kettle and heating the water to a temperature in the range of 140° to 150° F. Add the potassium citrate to the water with agitation. Add the sodium citrate to the mixture. Hold the slurry under agitation at a temperature in the range of 140° to 150° F.

Prepare a blend by first placing the citrate slurry in a blend tank and agitating it well, and then adding the carbohydrate/mineral slurry with agitation. The protein in water slurry is then added to the blend, the protein-in-fat slurry is then added to the blend. During the blending process the various components of the fiber system, which were varied in the experimental protocol were added to the blend.

The pH of each batch was then adjusted to be in the range of 6.75 to 6.85 by adding a sufficient amount of potassium hydroxide to the blend. The blend was then heat treated.

Prepare an ascorbic acid solution by adding to about 8 pounds of water the following ingredients; ascorbic acid, choline chloride, carnitine, 45% potassium hydroxide. Adjust the pH of this solution to be in the range of 6.0-10.0 using additional 45% potassium hydroxide. Add the ascorbic acid solution to the blend and mix thoroughly.

Prepare a vitamin/taurine solution by dissolving in about 4.4 pounds of water the water soluble vitamin premix and taurine. Add this solution to the blend.

Dilute the blend with the necessary amount of water to bring the percentage of total solid content, fat and protein to be within the desired ranges. Place the blend in suitable containers and then sterilize the product.

PHASE ONE: Insoluble/Soluble Blends with Nutriloid FiberPlus ®

Batches of the base formulation were prepared using pea and/or oat hull fiber as the insoluble fiber fraction while using sodium carboxymethylcellulose (CMC) and Nutriloid FiberPlus ®, which is a proprietary guar gum/gum arabic blend supplied by TIC Gums, Inc. of Belkamp, Md. U.S.A., as the soluble components. Formulations for these experimental batches are shown in Table II.

Guar gum is a high-molecular weight hydrocolloidal polysaccharide made up mainly of galactan and mannan units combined through glycosidic linkages, which may be described chemically as galactomannan.

Gum arabic, also known as acacia, is an emulsifier, stabilizer and thickener. It is obtained from dried exudates of various acacia trees. Chemically, gum arabic is a heterogenous polysaccharide with slightly acidic characteristics, mainly in the form of its potassium salt.

Sodium carboxymethylcellulose is a white, odorless, tasteless, nontoxic solid, for which the only solvent is water. It is understood that a sodium carboxymethylcellulose used in the practice of the present invention preferably has a viscosity in a 1% solution in water of not greater than 15 cps. Such a low viscosity CMC is available from TIC Gums, Inc. of Belkamp, Md. U.S.A.

The oat hull fiber used in the practice of the present invention is understood to comprise ground up oat hulls. Preferably in the practice of this invention the oat hulls have been subjected to a bleaching treatment in a reaction medium comprising an aqueous solution of strong alkali and hydrogen peroxide at a controlled pH in the range of about 11.2 to about 11.8 until substantially all of the polysaccharide in the substrate has been made available as a water soluble fraction, and recovering the water-insoluble polysaccharide fraction from the reaction medium. This method of treatment is taught in U.S. Pat. No. 4,806,475 which is incorporated herein for the purpose of teaching this method.

TABLE II

PHASE ONE FORMULATIONS

FIBER SYSTEM

| BATCH | PEA (%) | OAT (%) | FIBERPLUS ® (%) | CMC (%) |
|---|---|---|---|---|
| A1 | 75 | 0 | 20 | 5 |
| A2 | 75 | 0 | 15 | 10 |
| A3 | 0 | 75 | 20 | 5 |
| A4 | 0 | 75 | 15 | 10 |
| B1 | 75 | 0 | 20 | 5 |
| B2 | 75 | 0 | 10 | 15 |
| B3 | 65 | 0 | 20 | 15 |
| B4 | 0 | 75 | 10 | 15 |
| B5 | 85 | 0 | 10 | 5 |
| B6 | 0 | 85 | 10 | 5 |
| B7 | 0 | 65 | 20 | 15 |
| B8 | 0 | 75 | 20 | 5 |
| C1 | 0 | 85 | 10 | 5 |
| C2 | 0 | 65 | 20 | 15 |
| C3 | 65 | 0 | 20 | 15 |
| C4 | 0 | 75 | 20 | 5 |
| C5 | 75 | 0 | 20 | 5 |
| C6 | 0 | 75 | 10 | 15 |
| C7 | 75 | 0 | 10 | 15 |
| C8 | 85 | 0 | 10 | 5 |

Samples from experimental series A1–A4, containing 15% to 20% FiberPlus ®, exhibited gross destabilization (extreme graininess and creaming) and were not subjected to physical stability testing. Samples from series B1–B8 and C1–C8 were prepared with several factors theorized to be significant in the destabilization observed in samples A1–A4 including FiberPlus ®/CMC level, nutrient base, oil blend and insoluble fiber source (pea/oat). Initial visual evaluation of this sample set indicated that samples containing the lower level of FiberPlus ® exhibited a slightly less grainy, but still significant appearance. Additionally, pea fiber was determined to be unacceptable for future consideration as it settled rapidly in samples containing this fiber source. As none of the samples from the series B1–B8 and C1–C8 were judged to be aesthetically acceptable, no physical stability testing was conducted.

The visual results were used as a basis for the experimental design of the subsequent Phase Two work.

PHASE TWO: Insoluble/Soluble Blends (Individual Soluble Components)

As a result of poor stability attributes observed in Phase One material containing Nutriloid FiberPlus ®, two experimental designs were conducted to determine which ingredients were causing problems within the base formula system. It was theorized that the soluble fiber source was among the significant factors influencing physical stability. Two experimental designs were employed to determine which of the soluble fiber sources caused destabilization and if other factor(s) effected stability as well. Products in experimental design number one were manufactured with 5.0 grams of fiber per 8 ounce serving. Of these 5.0 grams, 75% of the fiber blend consisted of oat hull fiber, and the remaining 25% consisted of either 15% gum arabic or guar gum and 10% CMC. All of the fiber components were added individually as opposed to being added as a preblended ingredient such as FiberPlus ®.

Formulations for the batches manufactured during the course of the Phase Two-Design One are presented in Table III and the test results for these same batches are presented in Table IV.

TABLE III

| PHASE TWO-DESIGN ONE FORMULATIONS | | | | |
|---|---|---|---|---|
| | FIBER (%) | | | |
| BATCH | CMC | GUM ARABIC | GUAR GUM | OAT HULL |
| D1 | 0 | 15 | 10 | 75 |
| D2 | 15 | 15 | 0 | 70 |
| D3 | 0 | 0 | 10 | 90 |
| D4 | 15 | 0 | 10 | 75 |
| D5 | 15 | 0 | 0 | 85 |
| D6 | 0 | 0 | 0 | 100 |
| D7 | 0 | 15 | 0 | 85 |
| D8 | 15 | 15 | 10 | 60 |

TABLE IV

| PHASE TWO-DESIGN ONE FORMULATIONS | | | | |
|---|---|---|---|---|
| BATCH | GRAIN | pH | VISCOSITY | AGTRON |
| D1 | 6 | 6.71 | 33.1 | 20.1 |
| D2 | 1 | 6.62 | 19.6 | 41.2 |
| D3 | 1 | 6.62 | 23.6 | 34.0 |
| D4 | 1 | 6.62 | 29.6 | 33.7 |
| D5 | 1 | 6.62 | 19.5 | 41.6 |
| D6 | 1 | 6.62 | 20.3 | 40.4 |
| D7 | 1 | 6.62 | 17.6 | 42.2 |
| D8 | 1 | 6.60 | 33.2 | 36.2 |

Results from the first experimental design (Table IV) used to evaluate sample set D1-D8 indicated that destabilization exhibited as increased viscosity and decreased color was caused primarily by the presence of guar gum. This was consistent with Phase One observations in that FiberPlus ® contains guar gum. Increasing CMC induces an increase in Agtron rating with only a slight increase in viscosity. Gum arabic increases cause a slight color decrease with a minimal viscosity increase, while guar gum is seen to decrease color about 10 Agtron units and increase viscosity more than 10 cps.

In experimental design two insoluble fiber was present as oat hull fiber from D. D. Williamson or Canadian Harvest at a concentration of 75% of the total dietary fiber (TDF) in each batch. These oat hull fibers are essentially the same, although these suppliers is believed to process oat hull fiber in a slightly different manner. In Table IV "FIF/FIW" refer to whether the whether the fiber was added to the product as part of the fat (FIF) blends or in water (FIW) blends.

TABLE V

| PHASE TWO-DESIGN TWO FORMULATIONS | | | | | | |
|---|---|---|---|---|---|---|
| BATCH | BLEND pH | OAT SOURCE (75% of TDF) | ADDITION FIF/FIW | POTASSIUM IN CHO/MIN | PROCESSING SOLIDS | GUM TYPE (10% OF TDF) |
| E1 | 6.80 | Williamson | FIW | Current | 24.5% | Guar |
| E2 | 6.40 | Snowite | FIW | 20% Less | 24.5% | Guar |
| E3 | 6.80 | Williamson | FIF | 20% Less | 27.0% | Guar |
| E4 | 6.80 | Snowite | FIF | 20% Less | 24.5% | CMC |
| E5 | 6.80 | Snowite | FIW | Current | 27.0% | CMC |
| E6 | 6.40 | Williamson | FIF | Current | 24.5% | CMC |
| E7 | 6.40 | Snowite | FIF | Current | 27.0% | CMC |
| E8 | 6.40 | Williamson | FIW | 20% Less | 27.0% | CMC |
| F1 | 6.80 | Snowite | FIF | Current | 24.5% | Guar |
| F2 | 6.80 | Snowite | FIW | 20% Less | 27.0% | Guar |
| F3 | 6.40 | Snowite | FIW | Current | 24.5% | CMC |
| F4 | 6.40 | Williamson | FIW | Current | 27.0% | Guar |
| F5 | 6.80 | Williamson | FIF | 20% Less | 24.5% | CMC |
| F6 | 6.40 | Snowite | FIF | 20% Less | 27.0% | CMC |
| F7 | 6.80 | Williamson | FIF | Current | 27.0% | CMC |
| F8 | 6.40 | Williamson | FIF | 20% Less | 24.5% | Guar |

TABLE VI

| PHASE TWO-DESIGN TWO FORMULATIONS | | | | |
|---|---|---|---|---|
| BATCH | GRAIN | pH | VISCOSITY | AGTRON |
| E1 | 1 | 6.76 | 19.5 | 46.1 |
| E2 | 6 | 6.36 | 34.0 | 41.8 |
| E3 | 1 | 6.74 | 23.3 | 45.9 |
| E4 | 1 | 6.70 | 13.7 | 45.2 |
| E5 | 1 | 6.69 | 16.0 | 44.7 |
| E6 | 1 | 6.48 | 27.6 | 46.0 |
| E7 | 6 | 6.37 | 34.4 | 39.5 |
| E8 | 1 | 6.44 | 20.7 | 47.4 |
| F1 | 1 | 6.64 | 19.6 | 41.2 |
| F2 | 1 | 6.62 | 20.1 | 44.7 |
| F3 | 1 | 6.31 | 25.6 | 45.7 |
| F4 | 3 | 6.41 | 44.4 | 42.8 |
| F5 | 1 | 6.69 | 21.2 | 45.8 |
| F6 | 1 | 6.29 | 26.4 | 46.1 |
| F7 | 1 | 6.72 | 19.8 | 45.5 |
| F8 | 3 | 6.40 | 38.9 | 44.0 |

A repeat of the guar evaluation in the second experimental design confirmed the Design One observation as well as indicating that pH was also a factor in stability (Tables V & VI). In Tables V and VI "GRAIN" is a qualitative description of protein stability with 1 being best and 6 being worst (i.e. significant flocculation), and "AGTRON" is a color scale that goes from 1 to 100 with 1 being very dark and 100 being white. Results of the second design indicated maximum stability (lowest viscosity) was obtained at high pH (6.8) when guar gum was eliminated from the formulation. The source of oat hull fiber (Williamson versus Canadian Harvest) appeared to be insignificant in effecting product quality although slight viscosity increases were noted with oat hull fiber from Williamson. Minor increases in color were induced by decreasing potassium levels, changing from FIF to FIW and increasing pH. None of these factors, were viewed to be significant. Successful prototypes were generated during the Phase II work containing 75% oat hull fiber/15% gum arabic/10% CMC represent optimized samples based on original product requirements.

At this point it was concluded that the base formulation containing a blend of oat hull fiber, gum arabic and sodium carboxymethylcellulose appeared to yield optimum physical stability.

In order to further evaluate the use of a fiber system comprising oat hull fiber, gum arabic and sodium carboxymethylcellulose three replicate sample sets were manufactured according to the Bill of Materials set forth in TABLE VII using the method set forth in the paragraphs which immediately follow TABLE VII.

TABLE VII

| INGREDIENT | TOTAL ADDED PER 1000 LBS FINISHED PRODUCT |
|---|---|
| Canola Oil | 17.4 Pounds |
| High Oleic Safflower Oil | 10.4 Pounds |
| Medium Chain Triglycerides (Fractionated Coconut Oil) | 7.0 Pounds |
| Oil Soluble Vitamin Lecithin | 1.50 Pounds |
| Premix (containing Vitamin A, D, E and K)[1] | 27.2 Grams |
| Calcium Caseinate | 6.07 Pounds |
| Water | 764.8 Pounds |
| Ultra Trace Mineral/Trace Mineral Premix[2] | 109 Grams |
| Potassium Chloride | 0.85 Pounds |
| Potassium Iodide | 0.086 Grams |
| Magnesium Phosphate | 2.1 Pounds |
| Micronized Tricalcium Phosphate | 2.13 Pounds |
| Hydrolized Corn Starch (Dextrose Equivalent 10.0) | 96.7 Pounds |
| Hydrolized Corn Starch (Dextrose Equivalent 20.0) | 32.2 Pounds |
| Sodium Caseinate | 38.9 Pounds |
| Potassium Citrate | 1.953 Pounds |
| Sodium Citrate | 1.06 Pounds |
| Gum Arabic | VARIED IN EXPERIMENTS |
| Oat Hull Fiber | VARIED IN EXPERIMENTS |
| Sodium Carboxymethylcellulose | VARIED IN EXPERIMENTS |
| Ascorbic Acid | 242.2 Grams |
| 45% Potassium Hydroxide | 126 Grams |
| Choline Chloride | 252.5 Grams |
| Carnitine | 80.0 Grams |
| Water Soluble Vitamin Premix[3] | 37.5 Grams |
| Taurine | 70.2 Grams |

[1]Each gram of the premix provides about: 106,400–115,500 IU Vitamin A Palmitate; 5,700–7,500 IU Vitamin D3; 645–825 IU Vitamin E; 1,100–1,600 mg Vitamin K₁
[2]Each gram of the premix provides about: 77–88 mg Zinc; 59–67 mg iron; 17–18 mg manganese; 7–8 mg copper; 2–3 mg selenium; 2–3 mg chromium; 5–6 mg molybdenum
[3]Each gram of the premix provides about: 326–424 mg Niacinamide; 211–274 mg d-Calcium Pantothenate; 7–10 mg Folic Acid; 54–70 mg [Thiamine Chloride Hydrochloride]; 42–55 mg Riboflavin; 52–67 mg Pyridoxine Hydrochloride; 138–193 mg Cyanocobalamin; 6–8 mg Biotin A protein-in-fat slurry is prepared by placing the canola oil, high oleic safflower oil and medium chain triglycerides oil in a tank and heating the oil blend to a temperature in the range of 140° to 150° F. under agitation. The oil soluble vitamin lecithin is added to the oil blend, and then the vitamin premix is added to the oil blend. The calcium caseinate is added to the oil blend under agitation.

A carbohydrate/mineral slurry is prepared by placing about 124 to 131 lbs of water in a tank and heating the water to a temperature in the range of 145° to 160° F. The ultra trace mineral/trace mineral premix is added to the water and the mixture is agitated for five minutes. Add the potassium chloride, potassium iodide, magnesium phosphate and micronized tricalcium phosphate to the mixture with agitation. Add the hydrolized corn starch (dextrose equivalent 10.0) to the mixture and agitate thoroughly. Add the hydrolized corn starch (dextrose equivalent 20.0) to the mixture and mix well. Hold the mixture at a temperature in the range of 140° to 160° F.

A protein-in-water slurry is prepared by placing about 276 lbs of water in a tank and heating it to a temperature in the range of 145° to 155° F. Add the sodium caseinate to the water and agitate the mixture until the sodium caseinate is dissolved. Hold the slurry at a temperature in the range of 140° to 150° F.

Prepare a citrate slurry by placing about 275 to 282 lbs of water in a kettle and heating the water to a temperature in the range of 140° to 150° F. Add the potassium citrate to the water with agitation. Add the sodium citrate to the mixture. Hold the slurry under agitation at a temperature in the range of 140° to 150° F.

A blend is prepared by first placing the citrate slurry in a blend tank and agitating it well. Add the gum arabic to the citrate slurry with agitation. The gum arabic will not readily go into solution and may take a few minutes to completely dissolve. It is necessary to maintain rapid agitation and assure that the gum arabic is dissolved before continuing. The oat hull fiber is then added to the blend under agitation. The carbohydrate/mineral slurry is then added to the blend with agitation. The protein-in-water slurry is then added to the blend. Place all of the protein-in-fat slurry in a container and add the sodium carboxymethylcellulose to it with agitation. Rinse the container with some of the blend to insure proper transfer. Add the protein-in-fat slurry to the blend, and rinse the container with some of the blend to insure proper transfer.

Use 1N potassium hydroxide to adjust the pH of the blend to be in the range of 6.75 to 6.85. Maintain the temperature of the blend in the range of 140° to 150° F. for a maximum of 2 hours before heat treatment and homogenization.

The blend is subjected to Ultra High Temperature Short Time (UHTST) heat treatment and homogenization by the following procedure. The blend is preheated to a temperature in the range of 155° to 165° F. and then deaerated at 10 to 15 inches Hg. The blend is then emulsified at 900–1,100 psig. The blend is then heated to a temperature in the range of 229° to 231° F. and held at this temperature for a minimum of 10 seconds. The blend is then UHTST heat treated to a temperature of 292° to 294° F. with a minimum hold time of 5 seconds. If desired, the blend could instead be subjected to High Temperature Short Time heat treatment without adversely affecting product stability, as demonstrated in TABLE VIII. The blend is then passed through a flash cooler to reduce the temperature of the blend to 248° to 252° F. The blend is then passed through a plate cooler to reduce the temperature of the blend to 160° to 170° F. The blend is then homogenized at 3,900–4,100/400–600 psig. The homogenized blend is held at a temperature of 165° to 175° F. for a minimum of 16 seconds. The blend is cooled to 34° to 44° F.

Three sets of replicate sample batches were prepared using the recipe presented in TABLE VII using the foregoing manufacturing procedure, with any variations in the procedure being footnoted in the following TABLES VIII, IX and X.

TABLE VIII

FIBER RATIOS (% OF TOTAL DIETARY FIBER BY WEIGHT) FOR FIRST SET OF REPLICATE BATCHES

| BATCH | OAT FIBER | FIBER BLEND GUM ARABIC | CMC |
|---|---|---|---|
| G1 | 80% CANADIAN HARVEST | 10% | 10% |
| G2 | 80% WILLIAMSON | 10% | 10% |
| G3 | 75% CANADIAN HARVEST | 17.5% | 7.5% |
| G4 | 75% WILLIAMSON | 17.5% | 7.5% |
| G5 | 70% CANADIAN HARVEST | 10% | 20% |
| G6 | 70% WILLIAMSON | 10% | 20% |
| G7* | 70% CANADIAN HARVEST | 20% | 10% |
| G8* | 70% WILLIAMSON | 20% | 10% |

*BATCHES UHT'ED as set forth above, ALL OTHER BATCHES WERE PROCESSED VIA HIGH TEMPERATURE SHORT TIME (HTST) STANDARD PASTEURIZATION AT 165° to 175° F. FOR 16 SECONDS

TABLE IX

FIBER RATIOS (% OF TOTAL DIETARY FIBER BY WEIGHT) FOR SECOND SET OF REPLICATE BATCHES (ALL BATCHES PROCESSED VIA UHT AS DESCRIBED ABOVE)

| BATCH | OAT FIBER | FIBER RATIOS GUM ARABIC | CMC |
|---|---|---|---|
| H1 | 80% CANADIAN HARVEST | 10% | 10% |
| H2 | 80% WILLIAMSON | 10% | 10% |
| H3 | 75% CANADIAN HARVEST | 17.5% | 7.5% |
| H4 | 75% WILLIAMSON | 17.5% | 7.5% |
| H5 | 70% CANADIAN HARVEST | 10% | 20% |
| H6 | 70% WILLIAMSON | 10% | 20% |
| H7 | 70% CANADIAN HARVEST | 20% | 10% |
| H8 | 70% WILLIAMSON | 20% | 10% |

TABLE X

FIBER RATIOS (% OF TOTAL DIETARY FIBER BY WEIGHT) FOR THIRD SET OF REPLICATE BATCHES (ALL BATCHES PROCESSED VIA UHT AS DESCRIBED ABOVE)

| BATCH | OAT FIBER | FIBER RATIOS GUM ARABIC | CMC |
|---|---|---|---|
| J1 | 80% CANADIAN HARVEST | 10% | 10% |
| J2 | 80% WILLIAMSON | 10% | 10% |
| J3 | 75% CANADIAN HARVEST | 17.5% | 7.5% |
| J4 | 75% WILLIAMSON | 17.5% | 7.5% |
| J5 | 75% CANADIAN HARVEST | 20% | 5% |
| J6 | 75% WILLIAMSON | 20% | 5% |
| J7 | 70% CANADIAN HARVEST | 20% | 10% |
| J8 | 70% WILLIAMSON | 20% | 10% |

For each of the replicate batches a portion of the batch was packaged in 8 ounce metal cans (labeled as "M" in Table XI) and a portion of the batch was packaged in one liter plastic containers (labeled as "P: in Table XI).

As indicated in Table XI the physical stability of the retorted batches varies depending upon the levels of fibers present. In general, batches containing various levels of soluble fiber(CMC and gum arabic) exhibited similar viscosities as long as the CMC content did not exceed 10% by weight of the fiber system. Physical stability was not tested for variations 4 and 5 of replicate sets G and H due to the presence of gross destabilization believed to have been caused by the high level (20%) of CMC. Batches containing 7.5% CMC exhibited slightly lower viscosities than samples containing 10% CMC, due to CMC acting as a "gum" or stabilizer which influences viscosity based on concentration. As gum arabic imparts very little viscosity, variations in gum arabic concentration were not observed to significantly effect replicate sample viscosity. Viscosities of all replicate batches were observed to range from 20 to 35 cps which is satisfactory for both oral intake and tube feeding. Container type was not observed to cause significant product differences.

Several batches (e.g. G1, J1, J7) containing oat hull fiber from Canadian Harvest exhibited poorer stability (high grain/darker color) when compared to an equivalent formulation containing oat hull fiber from Williamson. The reason for this variation between the suppliers is not known. Therefor, it is preferred that oat hull fiber from Williamson, (their stock number 782 with a brand name of "BETTER BASICS") be used in the practice of a preferred embodiment of this invention.

TABLE XI

4 DAY PHYSICAL STABILITY DATA FOR REPLICATE BATCHES

| BATCH | pH | VISCOSITY (cps) | GRAIN | AGTRON | OSMOLALITY (MOSM/Kg WATER) |
|---|---|---|---|---|---|
| G1-M | 6.74 | 23.3 | 6 | 39.2 | |
| G1-P | 6.71 | 21.8 | 6 | 37.6 | 310 |
| G2-M | 6.74 | 26.0 | 1 | 40.5 | 314 |
| G2-P | 6.71 | 25.7 | 1 | 40.7 | 311 |
| G3-M | 6.76 | 20.5 | 1 | 41.7 | 306 |
| G3-P | 6.71 | 19.5 | 1 | 40.8 | 301 |
| G4-M | 6.74 | 22.7 | 1 | 43.6 | |
| G4-P | 6.69 | 22.3 | 1 | 42.8 | 306 |
| G7-M | 6.74 | 25.8 | 1 | 39.7 | 301 |
| G7-P | 6.69 | 26.3 | 6 | 37.9 | .300 |
| G8-M | 6.76 | 26.3 | 1 | 41.7 | |
| G8-P | 6.71 | 25.8 | 1 | 39.2 | 308 |
| H1-M | 6.70 | 26.2 | 1 | 37.6 | |
| H1-P | 6.65 | 29.9 | 1 | 37.6 | 295 |
| H2-M | 6.72 | 30.9 | 1 | 40.7 | |
| H2-P | 6.67 | 30.1 | 1 | 38.3 | 308 |

TABLE XI-continued

4 DAY PHYSICAL STABILITY DATA FOR REPLICATE BATCHES

| BATCH | pH | VISCOSITY (cps) | GRAIN | AGTRON | OSMOLALITY (MOSM/Kg WATER) |
|---|---|---|---|---|---|
| H3-M | 6.70 | 21.9 | 1 | 39.1 | |
| H3-P | 6.67 | 21.7 | 1 | 38.1 | 292 |
| H4-M | 6.72 | 27.4 | 1 | 41.3 | 301 |
| H4-P | 6.65 | 25.9 | 1 | 38.7 | 304 |
| H7-M | 6.70 | 28.6 | 1 | 38.5 | |
| H7-P | 6.65 | 32.6 | 1 | 35.9 | 306 |
| H8-M | 6.70 | 28.6 | 1 | 41.5 | 307 |
| H8-P | 6.67 | 28.9 | 1 | 38.9 | 307 |
| J1-M | 6.83 | 36.2 | 6 | 33.6 | |
| J1-P | 6.79 | 42.5 | 6 | 32.7 | |
| J2-M | 6.84 | 30.4 | 1 | 38.6 | |
| J2-P | 6.79 | 27.7 | 1 | 36.7 | 297 |
| J3-M | 6.84 | 22.6 | 1 | 38.4 | |
| J3-P | 6.77 | 21.4 | 1 | 36.7 | 294 |
| J4-M | 6.82 | 27.5 | 1 | 39.2 | |
| J4-P | 6.77 | 23.9 | 1 | 37.4 | 292 |
| J5-M | 6.81 | 19.4 | 1 | 39.5 | |
| J5-P | 6.77 | 17.4 | 1 | 38.6 | 297 |
| J6-M | 6.84 | 23.9 | 1 | 40.1 | |
| J6-P | 6.77 | 20.3 | 1 | 37.4 | 304 |
| J7-M | 6.82 | 31.4 | 6 | 35.1 | |
| J7-P | 6.77 | 49.5 | 6 | 37.3 | |
| J8-M | 6.81 | 29.2 | 1 | 39.1 | |
| J8-P | 6.76 | 27.0 | 1 | 37.2 | 300 |

As a result of the foregoing trials it may be concluded that for a liquid nutritional product a fiber system comprising by weight 70% to 75% oat hull fiber, 7.5% to 10% sodium carboxymethylcellulose exhibited good physical stability. Of course it will be understood by those skilled in the art that for any particular base formulation the fiber ratios may be varied while remaining within the scope of the invention. A liquid nutritional product which is the result of the replicate studies is the subject of U.S. patent application Ser. No. 722,439 filed on June 27, 1991 which is being filed at the U.S. Patent Office on the same day as this application.

A fiber system according to the present invention also has utility in a powdered nutritional product that may be reconstituted by a liquid. One example of a powdered nutritional product containing the fiber system of the present invention is a weight control product which is the subject of U.S. patent application Ser. No. 722,436 which is being filed at the U.S. Patent Office on the same date as this application. The Bill of Materials for making a two thousand pound batch of a chocolate flavored weight control product containing a dietary fiber system according to the present invention is set forth in TABLE XII, and the Bill of Materials for making a two thousand pound batch of a vanilla flavored weight control product containing a dietary fiber system according to the present invention is set forth in TABLE XIII.

TABLE XII

| INGREDIENT | QUANTITY |
|---|---|
| Base Powder (Spray Dried, 3% Moisture) | 999.20 lb |
| High Oleic safflower Oil | 167.305 lb |
| Soy Lecithin | 1.707 lb |
| Monoglycerides | 1.707 lb |
| Vitamin D3 | 1.028 g |
| Vitamin K | 0.258 g |
| Non-Fat Dry Milk | 774.204 lb |
| Minerals | 57.101 lb |
| Magnesium Chloride | 19.693 lb |
| Sodium Chloride | 7.623 lb. |
| Sodium Citrate | 14.769 lb |
| Potassium Citrate | 12.237 lb |
| Dipotassium Phosphate | 2.779 lb |
| Potassium Iodide | 0.8258 g |

TABLE XII-continued

| INGREDIENT | QUANTITY |
|---|---|
| Premix containing trace minerals and ultratrace minerals | 1382.451 g |
| Zinc Sulfate | 282.8495 g |
| Ferrous Sulfate | 272.3429 g |
| Manganese Sulfate | 74.8182 g |
| Copper Sulfate | 40.3676 g |
| Sodium Molybdate | 2.0391 g |
| Chromium Chloride | 1.9841 g |
| Sodium selenite | 0.7722 g |
| Sucrose-diluent | 621.8265 g |
| Citric Acid | 85.3249 g |
| Vitamin Premix | 2553.77 g |
| Ascorbic acid | 1117.27 g |
| dl Alpha Tocopheryl Acetate | 191.53 g |
| Niacinamide | 105.34 g |
| d-Calcium Pantothenate | 60.65 g |
| Vitamin A Palmitate | 18.45 g |
| Pyridoxine Hydrochloride | 12.77 g |
| Thiamine Mononitrate | 9.60 g |
| Riboflavin | 9.58 g |
| Folic Acid | 3.192 g |
| Biotin | 2.043 g |
| Phylloquinone | 0.112 g |
| Vitamin D3 | 0.0359 g |
| Cyanocobalamin | 0.0319 g |
| Flavoring Ingredients | |
| Natural and Artificial Chocolate Flavor | 10.554 lb |
| Ethyl Vanillin | 254.92 g |
| Artificial Vanilla Flavor | 166.02 g |
| Aspartame | 638.67 g |
| Sucrose | 450.34 lb |
| Total Milk Protein Isolate | 208.28 lb |
| Fiber System | 211.08 lb |
| Oat hull fiber | 105.54 lb |
| Gum Arabic | 84.44 lb |
| Sodium carboxymethylcellulose | 21.10 lb |
| Dutch Process Cocoa | 112.58 lb |
| Processing Aids | |
| Hydrogen Peroxide | |
| Enzyme Lactase | |
| 45% Potassium Hydroxide | |
| Citric Acid | |

TABLE XIII

| INGREDIENT | QUANTITY |
|---|---|
| Base Powder (Spray Dried, 3% Moisture) | 1062.00 lb |

TABLE XIII-continued

| INGREDIENT | QUANTITY |
| --- | --- |
| High Oleic Safflower Oil | 177.820 lb |
| Soy Lecithin | 1.815 lb |
| Monoglycerides | 1.815 lb |
| Vitamin D3 | 1.093 g |
| Vitamin K | 0.274 g |
| Non-Fat Dry Milk | 822.863 lb |
| Minerals | 60.687 lb |
| Magnesium Chloride | 20.930 lb |
| Sodium Chloride | 8.102 lb. |
| Sodium Citrate | 15.698 lb |
| Potassium Citrate | 13.003 lb |
| Dipotassium Phosphate | 2.954 lb |
| Potassium Iodide | 0.8777 g |
| Premix of trace minerals and ultratrace minerals | 1469.338 g |
| Zinc Sulfate | 300.6266 g |
| Ferrous Sulfate | 289.4596 g |
| Manganese Sulfate | 79.5206 g |
| Copper Sulfate | 42.9047 g |
| Sodium Molybdate | 2.1673 g |
| Chromium Chloride | 2.1088 g |
| Sodium Selenite | 0.8208 g |
| Sucrose-diluent | 660.9082 g |
| Citric Acid | 90.6875 g |
| Vitamin Premix | 2714.34 g |
| Ascorbic acid | 1187.52 g |
| dl Alpha Tocopheryl Acetate | 203.58 g |
| Niacinamide | 111.97 g |
| d-Calcium Pantothenate | 64.47 g |
| Vitamin A Palmitate | 19.61 g |
| Pyridoxine Hydrochloride | 13.57 g |
| Thiamine Mononitrate | 10.21 g |
| Riboflavin | 10.18 g |
| Folic Acid | 3.393 g |
| Biotin | 2.171 g |
| Phylloquinone | 0.119 g |
| Vitamin D3 | 0.0382 g |
| Cyanocobalamin | 0.0339 g |
| Flavoring Ingredients | |
| Artificial Vanilla Flavor | 2714.34 g |
| Ethyl Vanillin | 271.25 g |
| Aspartame | 475.37 g |
| Sucrose | 478.65 lb |
| Total Milk Protein Isolate | 221.37 lb |
| Fiber System | 224.37 lb |
| Oat hull fiber | 112.18 lb |
| Gum Arabic | 89.75 lb |
| Sodium carboxymethylcellulose | 22.44 lb |
| Processing Aids | |
| Hydrogen Peroxide | |
| Enzyme Lactase | |
| 45% Potassium Hydroxide | |
| Citric Acid | |

The first step in the process of manufacturing a weight control product containing a fiber system according to the invention is to manufacture the base powder.

An oil blend is prepared by placing the high oleic safflower oil in a kettle and heating the oil to a temperature in the range of 140° to 150° F. while agitating the oil. The soy lecithin and monoglycerides are then added to the heated oil, and the blend is agitated well until the emulsifiers are dissolved. The Vitamin D3 and Vitamin K are added to the blend, and the blend is maintained at a temperature in the range of 140° to 150° F. under agitation until it is added to the nonfat milk slurry.

The main ingredient of the base powder is either non-fat dry milk or condensed skim milk (substituted at an equivalent quantity of total solids) which is hydrolyzed by enzyme lactase to reduce the lactose content to a level that is tolerable by lactose-intolerant individuals. The non-fat dry milk, or condensed skim milk, may be of either the "low-heat or "high-heat" type. Preferably the non-fat dry milk, or condensed skim milk, is of the "low-heat" type because it provides enhanced functional and organoleptic properties.

Prior to dissolving the non-fat dry milk, about 2,600 pounds of processing water is heated to be in the range of 80°-100° F., preferably 80° to 85° F. Hydrogen peroxide is added to the water, or to the milk, to inhibit microbial growth during the lactose hydrolysis of the milk. The usage level of hydrogen peroxide may vary from 30 to 70 parts per million (ppm) depending upon the desired length of the time for hydrolysis of the lactose in the non-fat milk. For a short hydrolysis time of about four hours a hydrogen peroxide concentration of 30-40 ppm is recommended. For a longer hydrolysis time, as in the preferred method, of about fourteen to eighteen hours, a hydrogen peroxide concentration of 50-70 ppm is recommended. The non-fat dry milk is dissolved in water using agitation to form a slurry at a concentration of about 35% to about 45%, most preferably about 39% total solids by weight. After the non-fat milk has been completely dissolved in the water, the pH of the slurry is adjusted to be in the range of 6.4-6.6, preferably 6.5. It is usually necessary to raise the pH of the slurry by adding a suitable amount of a potassium hydroxide solution to the slurry. However, if too much potassium hydroxide is used and the pH of the slurry needs to be lowered, a citric acid solution is added to the slurry.

Enzyme lactase is then added to the non-fat milk slurry. The amount of enzyme lactase which is used depends upon the desired degree of lactose hydrolysis and the desired length of time for the lactose hydrolysis. For a short hydrolysis time of about four hours, an enzyme lactase usage level of about 4–5 g of enzyme per pound of milk solids and a hydrolysis temperature of about 90° to 100° F. is recommended. In a preferred embodiment using a hydrolysis time of about fourteen to eighteen hours, an enzyme lactase level of about 1.5–2.5 g per pound of milk solids and a hydrolysis temperature of 80° to 85° F. is preferred. The foregoing hydrolysis conditions result in a minimum of 70% lactose hydrolysis in the non-fat milk. The completion of the enzymatic hydrolysis is determined by ascertaining the level of residual lactose in the non-fat milk. The level of residual lactose can be determined by using chromatographic or enzymatic assay methods, for example the Boehringer Mannheim method for the determination of lactose and D-galactose in foodstuffs, Catalog Number 176303 of Boehringer Mannheim, Indianapolis, Ind. U.S.A.

The oil blend is added to the slurry. The slurry is then heated to a temperature in the range of 145° to 150° F. to inactivate the enzyme lactase. The slurry is homogenized, preferably using a two-stage homogenizer at 3,000±100 psig at the first stage and 500±100 psig at the second stage, then pasteurized (165°-175° F. for 16 seconds) and then cooled to 38°-44° F. and held at this temperature under agitation.

The minerals are then dissolved with agitation in about 500 pounds of water at a temperature in the range of 140° to 150° F. in the following order: magnesium chloride, sodium chloride, sodium citrate, potassium citrate and dipotassium phosphate. The solution containing the minerals is then added to the slurry with rapid agitation.

The potassium iodide is then dissolved in about 100 pounds of water at a temperature in the range of 80° to 110° F. Next, the premix of trace minerals and ultratrace minerals is dissolved in the potassium iodide solution with agitation. The resultant solution is then added to the slurry with agitation. After ten minutes of agitation the pH of the slurry is checked. The pH of the slurry should be in the range of 6.40 to 6.90. If necessary the pH of the slurry is adjusted to be in the specified range using potassium hydroxide or citric acid as described above.

The slurry is then spray dried to produce the base powder.

The base powder is dry blended with the remaining ingredients. In a preferred embodiment about twenty pounds of the base powder is dry blended with the vitamin premix and the flavoring ingredients. (In the case of the chocolate flavored product, the Dutch Process Cocoa is not included in this step as a flavoring ingredient.) The product of this step is then added to the remainder of the base powder. The sucrose, total milk protein isolate, fiber system, and in the case of the chocolate flavored product the Dutch Process Cocoa, are then dry blended with the base powder. While the components of the fiber system (oat hull fiber, gum arabic and sodium carboxymethylcellulose) have only been added to the dry blend individually thus far, it is believed that no adverse effects would be experienced if the components of the fiber system would first be dry blended together and then be dry blended with the base powder and other ingredients. It is understood that the sucrose maybe replaced by a starch hydrolysate (e.g. corn syrup solids or malto-dextrins) having a dextrose equivalent of 10-25.

For ease of dispersibility upon reconstitution with water, the dry blended product is agglomerated. The preferred method of agglomeration is a fluidized bed agglomeration process in which the rewetted powder particles are suspended in air in such a way that the process promotes rapid and complete agglomeration in a very small space. In the preferred embodiment the agglomerated particles should be of a size having a loose bulk density in the range of 0.25-0.33 g/cc and a moisture content in the range of 3% to 5%.

The agglomerated powder is then packaged in nitrogen-flushed single serving pouches or any other suitable containers, preferably with an oxygen level below 2%.

The spray drying and agglomeration steps may be omitted if the weight control product will be packaged as a ready-to-serve or concentrated liquid.

The contents of a pouch containing an amount of the weight control product in a dry powder form for one serving (about 67 g for a vanilla flavored product and about 71 g for a chocolate flavored product) is reconstituted in about nine ounces of water. A partial listing of the nutritional information for one serving of the weight control product of the invention are listed in TABLE XIV.

TABLE XIV

| Serving Size | 67.0 gram for Vanilla Flavored Product. |
| --- | --- |
| | 71.0 gram for Chocolate Flavored Product. |
| Calories | 240 |
| Protein | 16 gram |
| Fat | 6 gram |
| Carbohydrate | 30 gram |
| Dietary Fiber | 7 gram |

The dietary fiber system of a powdered weight loss product containing a dietary fiber system according to the present invention taken as a whole comprises by weight: 35% to 45%, most preferably about 40%, dietary fiber which is both soluble and fermentable; 5% to 15%, most preferably about 10%, dietary fiber which is both soluble and non-fermentable; and 45% to 55%, most preferably about 50%, dietary fiber which is both insoluble and non-fermentable. The dietary fiber system as a whole comprises by weight about 10 to 13% of the weight loss product in a powdered form of the product. In the preferred embodiment the dietary fiber which is both soluble and fermentable is gum arabic, the dietary fiber which is both soluble and non-fermentable is sodium carboxymethylcellulose, and the dietary fiber which is both insoluble and non-fermentable is oat hull fiber.

A dietary fiber system according to the present invention also has utility as a dry fiber system which may be added to a nutritional product, such as milk, fruit juice, other beverages, baked goods, etc. Several combinations of dietary fiber were dry blended together. Each of the fiber blends was then added to both orange juice and milk at a concentration of 3.4 g per 8 fluid ounce serving. In each of the trials the fiber blend was well dispersed.

In accordance with the invention a dietary fiber system for use in a nutritional product the fiber system as a whole comprises by weight: about 5% to 50%, preferably about 35% to 45% and most preferably about 40%, dietary fiber which is both soluble and fermentable; about 5% to 20%, preferably about 5% to 15% and most preferably about 10%, dietary fiber which is both soluble and non-fermentable; and about 45% to 80%, preferably about 45% to 55% and most preferably about 50%, dietary fiber which is both insoluble and non-fermentable. A liquid nutritional product according to the invention and a powdered substance according to the invention which may be blended with a liquid to make a liquid nutritional product contain the dietary fiber system set forth in the preceding sentence. In each of the foregoing embodiments of the invention it preferred that: the fiber which is both soluble and fermentable is gum arabic; the fiber which is both soluble an non-fermentable is sodium carboxymethylcellulose; and the fiber which is both insoluble and non-fermentable is at hull fiber.

The foregoing detailed description is given for clearness of understanding only, and no unnecessary limitations should be understood therefrom, as aspects and advantages within the scope of the present invention will be apparent to those skilled in the art.

We claim:

1. A dietary fiber system for use in a nutritional product wherein the fiber system as a whole comprises by weight: 5% to 50% dietary fiber which is both soluble and fermentable; 5% to 20% dietary fiber which is both soluble and non-fermentable; and 45% to 80% dietary fiber which is both insoluble and non-fermentable.

2. A dietary fiber system according to claim 1 wherein the fiber which is both soluble and fermentable is gum arabic; the fiber which is both soluble and non-fermentable is sodium carboxymethylcellulose; and the fiber which is both insoluble and non-fermentable is oat hull fiber.

3. A dietary fiber system for use in a nutritional product comprising by
   (a) about 5% to 50% gum arabic;
   (b) about 5% to 20% sodium carboxymethylcellulose; and
   (c) about 45% to 80% oat hull fiber.

4. A dietary fiber system according to claim 3 comprising by weight:

(a) about 35% to 45% gum arabic;
(b) about 5% to 15% sodium carboxymethylcellulose; and
(c) about 45% to 55% oat hull fiber.

5. A dietary fiber system according to claim 3 comprising by weight:
(a) about 40% gum arabic;
(b) about 10% sodium carboxymethylcellulose; and
(c) about 50% oat hull fiber.

6. A liquid nutritional product containing a dietary fiber system wherein the dietary fiber system as whole comprises by weight: 5% to 50% fiber which is both soluble and fermentable; 5% to 20% fiber which is both soluble and non-fermentable; and 45% to 80% fiber which is both insoluble and non-fermentable.

7. A liquid nutritional product according to claim 6 wherein an eight ounce serving of said product contains between 1 grams and 7 grams of said dietary fiber system.

8. A liquid nutritional product according to claim 6 wherein an eight ounce serving of said product contains between 1 grams and 7 grams of said dietary fiber system.

9. A liquid nutritional product according to claim 6 wherein the fiber which is both soluble and fermentable is gum arabic; the fiber which is both soluble and non-fermentable is sodium carboxymethylcellulose; and the fiber which is both insoluble and non-fermentable is oat hull fiber.

10. A liquid nutritional product containing a dietary fiber system wherein the dietary fiber system comprises by weight:
(a) about 5% to 50% gum arabic;
(b) about 5% to 20% sodium carboxymethylcellulose; and
(c) about 45% to 80% oat hull fiber.

11. A liquid nutritional product according to claim 10 wherein the dietary fiber system comprises by weight:
(a) about 35% to 45% gum arabic;
(b) about 5% to 15% sodium carboxymethylcellulose; and
(c) about 45% to 55% oat hull fiber.

12. A liquid nutritional product according to claim 11 wherein an eight ounce serving of said product contains between 1 grams and 7 grams of said dietary fiber system.

13. A liquid nutritional product according to claim 12 wherein the viscosity of said product is not greater than 100 centipoise.

14. A liquid nutritional product according to claim 11 wherein the viscosity of said product is not greater than 100 centipoise.

15. A liquid nutritional product according to claim 10 wherein the dietary fiber system comprises by weight:
(a) about 40% gum arabic;
(b) about 10% sodium carboxymethylcellulose; and
(c) about 50% oat hull fiber.

16. A liquid nutritional product according to claim 15 wherein an eight ounce serving of said product contains between 1 grams and 7 of said dietary fiber system.

17. A liquid nutritional product according to claim 16 wherein the viscosity of said product is not greater than 100 centipoise.

18. A liquid nutritional product according to claim 15 wherein the viscosity of said product is not greater than 100 centipoise.

19. A liquid nutritional product according to claim 10 wherein an eight ounce serving of said product contains between 1 grams and 7 grams of said dietary fiber system.

20. A liquid nutritional product according to claim 19 wherein the viscosity of said product is not greater than 100 centipoise.

21. A liquid nutritional product according to claim 10 wherein the viscosity of said product is not greater than 100 centipoise.

22. A powdered substance which may be blended with a liquid to make a liquid nutritional product said substance containing a dietary fiber system wherein the dietary fiber system taken as whole comprises by weight: 5% to 50% fiber which is both soluble and fermentable; 5% to 20% fiber which is both soluble and non-fermentable; and 45% to 80% fiber which is both insoluble and non-fermentable.

23. A powdered substance according to claim 22 the fiber which is both soluble and fermentable is gum arabic; the fiber which is both soluble and non-fermentable is sodium carboxymethylcellulose; and the fiber which is both insoluble and non-fermentable is oat hull fiber.

24. A powdered substance which may be blended with a liquid to make a liquid nutritional product, said substance containing a dietary fiber system comprising by weight:
(a) about 5% to 50% gum arabic;
(b) about 5% to 20% sodium carboxymethylcellulose; and
(c) about 45% to 80% oat hull fiber.

25. A powdered substance according to claim 24 wherein said dietary fiber system comprises by weight:
(a) about 35% to 45% gum arabic;
(b) about 5% to 15% sodium carboxymethylcellulose; and
(c) about 45% to 55% oat hull fiber.

26. A powdered substance according to claim 24 wherein said dietary fiber system comprises by weight:
(a) about 40% gum arabic;
(b) about 10% sodium carboxymethylcellulose; and
(c) about 50% oat hull fiber.

* * * * *

UNITED STATES PATENT AND TRADEMARK OFFICE
CERTIFICATE OF CORRECTION

PATENT NO. : 5,085,883

DATED : Feb. 4, 1992

INVENTOR(S) : Keith A. Garleb, James N. Chmura, Paul S. Anloague, Mary B. Cunningham, David C. Sertl It is certified that error appears in the above-identified patent and that said Letters Patent is hereby corrected as shown below:

Column 2 Line 7 "Itis" to --It is--

Column 7 Line 4 "Soluble Components]" to --Soluble Components)--

Column 13 Line 37 the phrase "which is being filed at the U.S. Patent Office on the same day as this application" should be deleted.

Column 13 Line 45 delete the phrase:
"which is being filed at the U.S. Patent Office on the same date as this application"

Column 18 Line 62 "uct comprising by" to --uct comprising by weight:--

Column 19 Line 18 "I" to --1--

Signed and Sealed this

Twenty-third Day of November, 1993

Attest:

BRUCE LEHMAN

*Attesting Officer*  *Commissioner of Patents and Trademarks*